US006496851B1

United States Patent
Morris et al.

(10) Patent No.: US 6,496,851 B1
(45) Date of Patent: Dec. 17, 2002

(54) MANAGING NEGOTIATIONS BETWEEN USERS OF A COMPUTER NETWORK BY AUTOMATICALLY ENGAGING IN PROPOSED ACTIVITY USING PARAMETERS OF COUNTERPROPOSAL OF OTHER USER

(75) Inventors: Harry W. Morris, Reston, VA (US); Robert G. Watkins, Vienna, VA (US)

(73) Assignee: America Online, Inc., Dulles, VA (US)

( * ) Notice: Subject to any disclaimer, the term of this patent is extended or adjusted under 35 U.S.C. 154(b) by 0 days.

(21) Appl. No.: 09/366,544

(22) Filed: Aug. 4, 1999

(51) Int. Cl.[7] ............................................. G06F 15/16
(52) U.S. Cl. ...................................... 709/204; 709/227
(58) Field of Search ................................ 709/204, 227; 705/21, 26

(56) References Cited

U.S. PATENT DOCUMENTS 3,701,971 A   10/1972  Sanner et al.
3,753,234 A   8/1973   Gilbert et al.

(List continued on next page.)

FOREIGN PATENT DOCUMENTS

EP        0 788 269 A2   8/1997

OTHER PUBLICATIONS

"WYSIWS Revised: Early Experiences with Multiuser Interfaces", M. Stefik et al., ACM Transactions on Office Information Systems, vol. 5, No. 2, Apr. 1987, pp. 147–167.
"Collaborative Systems and Multi–User Interfaces", Foster, Ph.D. Thesis, University of California, Computer Science Division, Oct. 31, 1986.
"Computer–Based Real–Time Conferencing Systems", Sarin and Greif, Computer, Oct. 1985, pp. 33–45.
Lichty, T., "The Official America Online for Windows 95 Tour Guide", 1996, USA, "The Guide Pager", pp. 238–239.

Rheingold, H., "The virtual Community (Homesteading on the Electronic Frontier)", http://www.rheingold.com/v.book, 24 pages (1998).

Farmer, F. Randall, "Habitat Anecdotes", Fall 1998, http://sunsite.unc.edu/pub/academic/communications/papers/habitat/anecdotes.rtf, 13 pages.

Morningstar, Chip et al., "The Lessons of Lucasfilm's Habitat"http://www.communities.com,company/papers/lessons.html, Sep. 1, 1998, 15 pages (1990).

J. Berkman, "Nonviolent Crowd Control", Proceedings of the ACM SIGUCCS 1993 User Services Converence XXI. Nov. 7–10, 1993, San Diego, CA, U.S., pp. 173–178.

(List continued on next page.)

Primary Examiner—Krisna Lim
(74) Attorney, Agent, or Firm—Fish & Richardson P.C.

(57) ABSTRACT

Interactions between users of a computer network are facilitated by transmitting a first user's proposal for an activity to another user, with the proposal including one or more parameters descriptive of the proposed activity. A response received from the other user may include a counterproposal having one or more parameters descriptive of the proposed activity, with at least one of the parameters of the counterproposal differing from a corresponding parameter of the proposal. The users automatically engage in the proposed activity using the parameters included in the counterproposal upon acceptance of the counterproposal by the first user.

55 Claims, 16 Drawing Sheets

U.S. PATENT DOCUMENTS

| | | | |
|---|---|---|---|
| 3,910,322 | A | 10/1975 | Hardesty, Jr. et al. |
| 4,045,789 | A | 8/1977 | Bristow |
| 4,063,220 | A | 12/1977 | Metcalfe et al. |
| 4,126,851 | A | 11/1978 | Okor |
| 4,274,139 | A | 6/1981 | Hodgkinson et al. |
| 4,414,621 | A | 11/1983 | Bown et al. |
| 4,521,014 | A | 6/1985 | Sitrick |
| 4,570,930 | A | 2/1986 | Matheson |
| 4,572,509 | A | 2/1986 | Sitrick |
| 4,648,061 | A * | 3/1987 | Foster ................. 709/228 |
| 4,752,069 | A | 6/1988 | Okada |
| 4,856,787 | A | 8/1989 | Itkis |
| 4,974,173 | A | 11/1990 | Stefik et al. |
| 4,987,492 | A | 1/1991 | Stults et al. |
| 5,013,047 | A | 5/1991 | Schwab |
| 5,083,271 | A | 1/1992 | Thacher et al. |
| 5,083,800 | A | 1/1992 | Lockton |
| 5,107,443 | A | 4/1992 | Smith et al. |
| 5,119,319 | A | 6/1992 | Tanenbaum |
| 5,220,501 | A * | 6/1993 | Lawlor et al. ............ 380/24 |
| 5,265,221 | A | 11/1993 | Miller |
| 5,586,257 | A * | 12/1996 | Perlman ................. 463/42 |
| 5,721,763 | A * | 2/1998 | Joseph et al. ............ 379/88 |
| 5,828,839 | A * | 10/1998 | Moncreiff ............... 709/204 |
| 5,956,485 | A * | 9/1999 | Perlman ................. 709/204 |
| 5,964,660 | A * | 10/1999 | James et al. .............. 463/1 |
| 5,987,503 | A * | 11/1999 | Murakami ............... 709/204 |
| 5,991,739 | A * | 11/1999 | Cupps et al. ............ 705/26 |
| 6,064,981 | A * | 5/2000 | Barni et al. ............. 705/26 |
| 6,073,105 | A * | 6/2000 | Sutcliffe et al. ........... 705/1 |
| 6,152,824 | A * | 11/2000 | Rothschild et al. ........ 463/42 |
| 6,212,548 | B1 * | 4/2001 | DeSimone et al. ....... 709/204 |
| 6,336,133 | B1 * | 1/2002 | Morris et al. ........... 345/758 |
| 6,339,784 | B1 * | 1/2002 | Morris et al. ........... 345/758 |

OTHER PUBLICATIONS

J. Johnson–Eiolola et al., "Policing Ourselves: Defining the Boundaries of Appropriate Discussion in Online Forums", Computers and Composition, vol. 13, No. 3, 1996, pp. 269–291.

CIMPU, V.F. et al, :"Cobra–Based Multimedia Audio Chat", Canadian Conference on Electrical and Computer Engineering, vol. 1, May 9, 1999, pp. 342–345.

Virgil Cimpu, et al., "COBRA–Based Multimedia Audio Chat", May 1, 1999, pp. 342–345.

* cited by examiner

State 1: Send Rendezvous Proposal

| Substate | Event | Meaning | Direction |
|---|---|---|---|
| 1.1 | Receive Accept | Negotiation Completed Successfully | Go to Substate 3.1 |
| 1.2 | Receive Client Error | Negotiation Completed Unsuccessfully | Go to Substate 3.2 |
| 1.3 | Receive Counter Proposal | Negotiation Continues | Go to State 2 |
| 1.4 | Time Out | Same as Cancel with Reason = Timeout | Go to Substate 3.3 |
| 1.5 | Send Cancel | Negotiation Cancelled | Go to Substate 3.3 |

State 2: Receive Proposal

| Substate | Event | Meaning | Direction |
|---|---|---|---|
| 2.1 | Send Accept | Negotiation Completed Successfully | Go to Substate 3.1 |
| 2.2 | Send Client Error | Negotiation Completed Unsuccessfully | Go to Substate 3.2 |
| 2.3 | Send Counter Proposal | Negotiation Continues | Go to State 1 |
| 2.4 | Receive Cancel | Negotiation Cancelled | Go to Substate 3.3 |

State 3: End = Kill the Rendezvous Cookie

| Substate | Event | Meaning | Direction |
|---|---|---|---|
| 3.1 | Receive Accept | Negotiation Completed Successfully | Engage in Online Activity |
| 3.2 | Receive Client Error | Negotiation Completed Unsuccessfully | End Negotiation |
| 3.3 | Receive Cancel | Negotiation Cancelled | End Negotiation |

FIG. 4

| Data Class | Values | Meaning |
|---|---|---|
| Message Type | 0 | Proposal |
| | 1 | Cancel Proposal |
| | 2 | Accept Proposal |
| Cookie | 8-byte unique identifier | ID for Rendezvous session |
| Service UUID* | 09461341-4C7F | AOL Talk |
| | 09461342-4C7F | Direct Play |
| | 09461343-4C7F | File Transfer |
| | 09461344-4C7F | Route Finder |
| | 09461345-4C7F | Direct ICBM |
| | 09461346-4C7F | Avatar Exchange |
| | 748F2420-6287 | Chat |
| Cancel Reason | 0 | Unknown |
| | 1 | Requested By Proposer |
| | 2 | Timeout |

FIG. 6

| Parameter Number | Content |
|---|---|
| 0 | Beginning of Reserved Range |
| 1 | ICBM Channel |
| 2 | IP Address |
| 3 | IP Address of Proposer |
| 4 | Verified IP Address of Proposer |
| 5 | Port |
| 6 | Not used |
| 7 | URL for Software Download |
| 8 | Verified URL for Software Download |
| 9 | Not used |
| 10 | Sequence Number |
| 11 | Cancel Reason |
| 12 | Invitation |
| 13 | Invitation Character Set |
| 14 | Invitation Language |
| 15 | Data Flag |
| 10000 | End of Reserved Range |

FIG. 7

| Code | Meaning |
|---|---|
| 0 | Proposal Unsupported |
| 1 | Proposal Denied |
| 2 | Proposal Ignored |
| 3 | Busted Parameters |
| 4 | Proposal Timed Out |
| 5 | Online But Not Available |

FIG. 9

MANAGING NEGOTIATIONS BETWEEN USERS OF A COMPUTER NETWORK BY AUTOMATICALLY ENGAGING IN PROPOSED ACTIVITY USING PARAMETERS OF COUNTERPROPOSAL OF OTHER USER

TECHNICAL FIELD

This invention relates to managing communications between users of a computer network.

BACKGROUND

The rapid emergence of the Internet and the World Wide Web has created an environment in which anybody in the world who can connect to the Internet through a personal computer is generally able to access the universe of information that is available via Web sites. Electronic mail (a.k.a. e-mail) has also become ubiquitous due to its ease of use and its low cost. The emergence of these capabilities has been spurred by technological advances in various areas, including microprocessors (both computing speed and miniaturization), computer operating systems and interfaces (e.g., Windows, Macintosh, and Unix), and Internet browsers (e.g., Netscape Navigator). In turn, the rapidity of increase of the technology has had a direct positive impact upon productivity, and the world economy in general. Thus, there is an incentive for high-tech entities to create further improvements in the state of the art with respect to the Internet.

An online forum is a communications interchange in which people may communicate with others through successive electronic transmissions between respective computer systems. An online forum, or any other type of distributed computer services, may be implemented on a distributed computer system such as that shown in FIG. 1. Forum participants (equivalently, users of the computer services) typically are scattered across a large geographical area and communicate with one or more central server systems 100 through respective client systems 102 (e.g., a personal or laptop computer). In practice, the server system 100 typically will not be a single monolithic entity but rather will be a network of interconnected server computers, possibly physically dispersed from each other, each dedicated to its own set of duties and/or to a particular geographic region. In such a case, the individual servers are interconnected by a network of communication links, in known fashion. One such server system is "America Online" from America Online Incorporated of Virginia (AOL).

Each client system 102 runs client software that allows it to communicate in a meaningful manner with corresponding software running on the server system 100. The client systems 102 communicate with the server system 100 through various channels, such as a modem 104 connected to a telephone line 106 or a direct Internet connection using a transfer protocol such as Transfer Control Protocol/Internet Protocol (TCP/IP). The server system 100 is responsible for receiving input from the client systems 102, manipulating the collective body of input information (and possibly information from other sources) into a useful format, and retransmitting the formatted information back to one or more clients 102 for presentation on an output device, such as a display screen.

A specific aspect of the Internet "culture" is the "chat room" phenomenon. A chat room is a virtual space (i.e., an electronic channel) in which some specific communications activity is ongoing. In some cases, the activity is an application, such as a computer game. In many other cases, the activity is a simple conversation, or "chat session", between the participants. Referring to FIG. 2, a chat room 200 is illustrated, in which the various participants 204 (e.g., "Allens9", "JOSHUAALEX", etc.) may enter text which appears in a scrolling text window 202 on each participant's computer display screen. In the example in FIG. 2, the chat room 200 has 22 participants whose identities (or "screen names") are listed in a scrolling window 210. A participant 204 may respond to the comment of another participant 204 by entering a line of text in an edit box 206 and activating (e.g., by clicking with a pointer device, such as a mouse) a SEND button 208. In response, the text in the scrolling text window 202 scrolls upwards and the newly entered line of text is displayed at the bottom of the scrolling text window 202. In the illustrated example, the last participant to enter a comment was JOSHUAALEX, who typed "TEXAS".

The chat room 200 shown in FIG. 2 is "public", meaning that it is generally open to any user of the online service who accesses it, and it typically has multiple participants who were placed in the chat room by the computer-service provider and who most likely never have met or conversed with one another before. A comment by a participant in a public forum may be seen by all of the participants of the chat room. If a participant desires some privacy, that participant may open and enter a "private" chat room (for example, by clicking on a "Private Room" button 212), and thereafter invite one or more other participants to enter the private chat room, which can be accessed exclusively by the originators and their invitees. Once in a private forum, participants may communicate with one another without fear that uninvited participants will be able to see their comments. It is also possible to have a semi-public chat room, which is open to a specified group of users.

AOL has created the AOL Instant Messenger (AIM™) system. The AIM system allows a user to create an electronic messaging medium known as a "Buddy List"™ of others (such as friends and family) with whom the user often interacts while online and send instant messages (IMs) to those users. The AIM system automatically informs the user whenever a member of that user's buddy list is online. Thus, the two buddies can communicate directly (i.e., chat) because they both are online and are aware of each other's presence.

Another development by AOL in this arena is the concept of "Evil". This concept arose in recognition of the fact that users can and do abuse the privileges afforded them by the abilities to communicate instantly with others and to transmit large volumes of information. Such abuse may occur, for example, when a user sends messages having objectionable content, or when a user overuses the AIM system by sending excessive numbers of messages to other users. Another form of abuse occurs when a user sends files that contain large amounts of data to another user, so that when the recipient tries to open or download the files, or even perform other activities, the recipient's computer system is slowed down due to the processing of the received files.

AOL's creation of the Evil concept is an attempt to remedy this and other types of abuse. If a user perceives that another user is behaving badly (e.g., repeatedly sending unwanted IMs), the offended user can "evil", or warn, the misbehaving user, thereby increasing the misbehaving user's Evil level. The effect of eviling a user typically is small but cumulative. Over time, if a user has been eviled a sufficient number of times, that user's ability to use system resources (e.g., send IMs) will be deliberately slowed as a punishment. If the abuse continues and even more eviling occurs, the abuser eventually can be involuntarily logged off the computer network. The underlying notion is to promote computer etiquette and basic courtesy in the online (and particularly chat room) environment. Giving users the power to "evil" one another gives them the ability to create a self-policing society, thus alleviating the Internet Service Provider (ISP) from having to perform the policing function. Further details on eviling techniques can be found in U.S. Ser. No. 09/076,483, filed May 13, 1998 now U.S. Pat. No. 6,336,133, entitled "Regulating Users of Online Forums", and U.S. Ser. No. 09/076,484, filed May 13, 1998 now U.S. Pat. No. 6,339,784 entitled "Self-Policing, Rate Limiting Online Forums", both of which are incorporated by reference.

Although it is possible for a chat room to be completely free-form dialogue on any subject, it is common for chat rooms to be organized around a specific subject for discussion. The proliferation of the chat room phenomenon has created a need for a mechanism to optimally arrange a chat room environment to meet the needs of the users. For example, a given user might desire to have a private conversation with a specific group of three other users on a particular subject. Alternatively, the user might wish to play a particular computer game jointly with two friends, each located at a different remote site. Presently, if such a user wishes to engage in such activity, the user can either 1) find an existing chat room where the desired activity is ongoing and attempt to join in, but not necessarily having any control over the identities or number of other participants; or 2) send an IM or e-mail message to the other users with whom the user wishes to engage in the activity and invite them to do so. Typically, the inviting user will receive either no response at all (e.g., if the recipient ignores the invitation) or a binary response (i.e., yes or no) to the invitation.

In light of the foregoing, the present inventors have recognized the need for a powerful and flexible negotiation mechanism, whereby users desiring to communicate or otherwise interact with each other can "bargain" with one another in order to agree ultimately upon a mutually acceptable communication (e.g., chat room) or other interaction (e.g., multiple user computer game) context.

SUMMARY

Implementations may include various combinations of the following features.

A protocol, referred to as the "Rendezvous" protocol, is designed to facilitate interactions between users of a computer network by transmitting a first user's proposal for an activity to another user. The proposal may include one or more parameters descriptive of the proposed activity. A response, such as an acceptance, a rejection, or a counterproposal, is received from the other user. Depending on the received response, the users may or may not selectively engage in the proposed activity.

One such activity could be an online "chat" session, and a typical set of parameters for a proposal to chat could include a proposed topic on which the chat session will be focused and a proposed channel in which the chat session will take place. Another typical activity could be an online computer game, and the specified parameters could identify proposed participants in the game.

An acceptance indicates agreement to all parameters of the proposal. A rejection indicates disagreement with at least one parameter of the proposal. A counterproposal indicates an offer to modify one or more of the proposal parameters.

If a counterproposal is made, a further response to the counterproposal can be made, and this response also can be an acceptance, a rejection, or yet another counterproposal. This sequence may occur indefinitely until acceptance or rejection occurs.

A cancellation of a proposal or counterproposal may be issued by the user that originally made the proposal or counterproposal, so long as this occurs prior to the receipt of a response. Typically, such a cancellation should include a reason for the cancellation.

In issuing a rejection, a user may indicate that the proposal is being ignored, either explicitly or implicitly (by inaction).

The protocol allows users to transmit messages, referred to as "Evil" messages, registering displeasure with any proposal, counterproposal, or acceptance. An Evil message has a cumulative (and potentially exponential) effect upon a recipient's ability to access the computer system's resources.

One objective of the protocol is to help online users produce an optimal environment for an activity by enabling them to negotiate the parameters of the activity until agreement is reached. Typical activities include exchanging voice messages, playing an online game, finding a route from one client computer to another, transferring files, direct instant messaging, exchanging avatars, participating in a chat room, or engaging in collaborative project development.

Another potential online activity that can make use of the Rendezvous protocol is e-commerce. The protocol lends itself to a negotiation of a sale/purchase of goods or services, or intangible property. Parameters of such a negotiation might typically include price, model, style, color, delivery details, and warranty details.

A rejection message may indicate a reason for the rejection. Typical reasons include the following: the proposed activity is unsupported by a client computer associated with a recipient of the proposal; the proposed activity was denied by a recipient of the proposal; a recipient of the proposal explicitly ignored the proposal; the proposal timed out; or the proposal message could not be understood.

In one embodiment, the Rendezvous protocol is implemented as computer software potentially within a larger computer software application. The protocol software is tangibly embodied in a computer-readable medium or propagated carrier signal. The protocol software contains instructions to allow the computer system to conduct an online negotiation session.

The techniques and mechanisms described here may provide one or more of the following advantages. The Rendezvous protocol provides users with the ability to negotiate characteristics of an interactive online environment (chat session, online game, etc.). As a result, users can tailor and optimize their online environments so that they are mutually agreeable to all participants. This optimization typically occurs prior to inception of the environment undergoing negotiation. Consequently, users can engage in environments of their own choosing and according to their own desires, and without encountering unwanted or undesirable circumstances or participants.

Additional features and advantages will be apparent from the following description, including the figures and the claims.

BRIEF DESCRIPTION OF THE DRAWINGS

FIG. 4 is a table of state transition values.

FIG. 6 is a table of data values for data fields in a negotiation protocol.

FIG. 7 is a table of parameters for a TLV field within a negotiation protocol message.

FIG. 9 is a table of data values for a Client Error Code data field.

DETAILED DESCRIPTION

Figure 1:
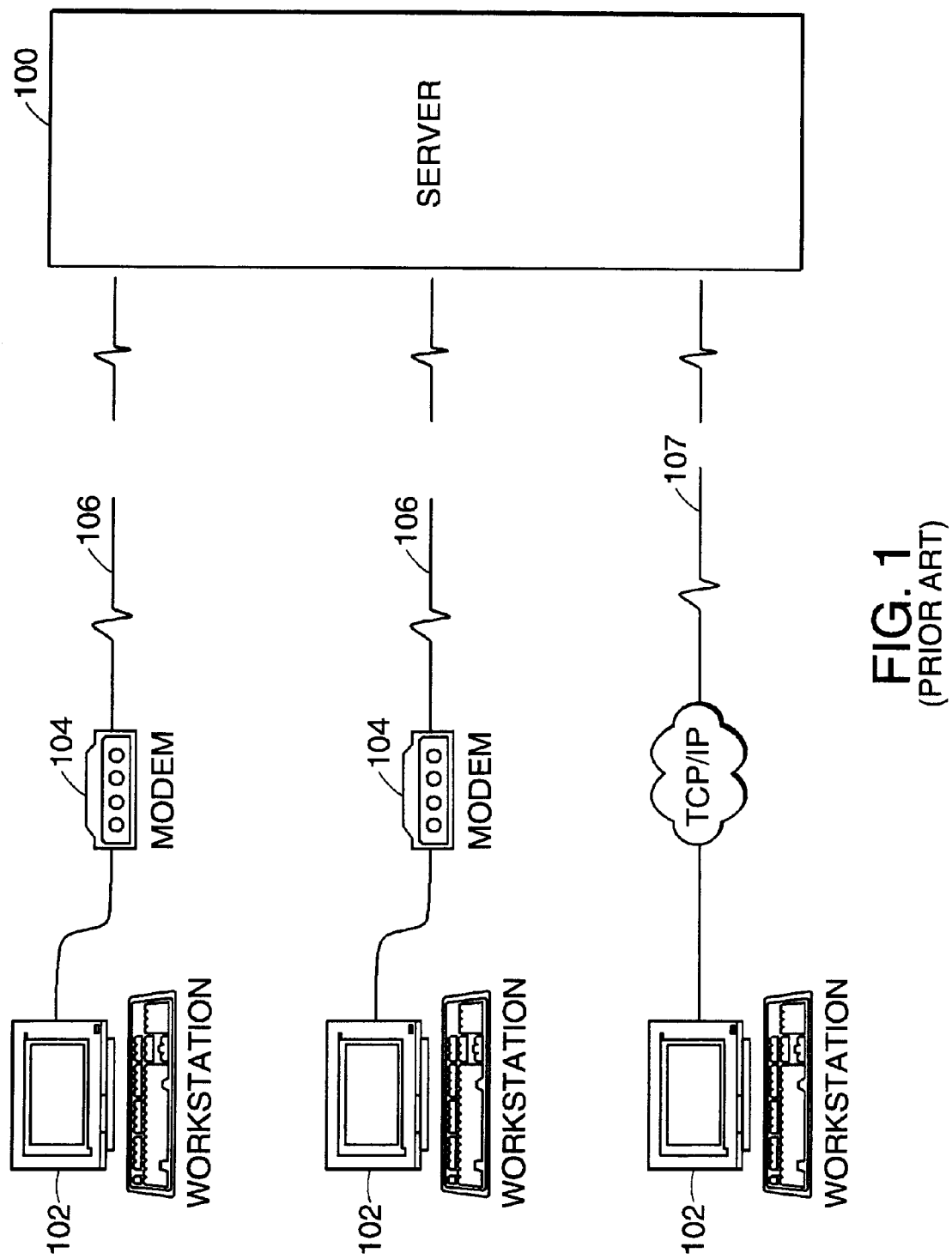
FIG. 1 shows a prior art distributed computer system of the type used for providing online computer services.
Figure 2:
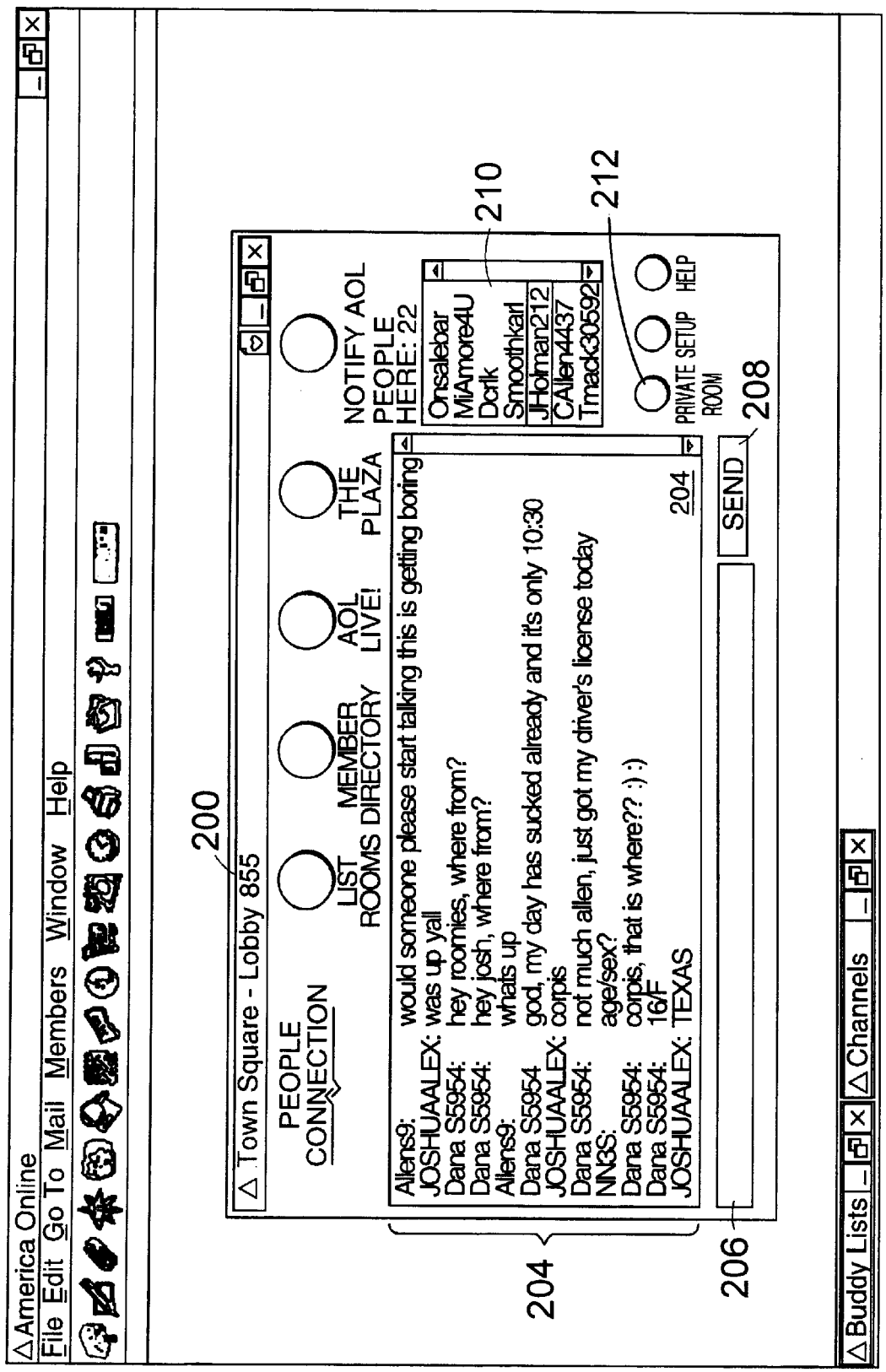
FIG. 2 is a screen shot showing an example of a prior art online computer chat room forum.

The present inventors have developed a negotiation protocol—referred to as the "Rendezvous" protocol—that provides a mechanism for negotiating between two or more computer users to arrange a mutually beneficial communication or multi-user interaction environment. One implementation of the Rendezvous protocol is in the AOL Instant Messenger (AIM) system, which allows users of a computer network to exchange instant messages (IMs) or to engage in a "chat" session, and further informs a user when any of that user's buddies are online in order to facilitate direct conversation. The Rendezvous protocol provides a general framework that software developers can use to implement various user-negotiation functionality in software applications. The AIM system, which allows users to chat, send IMs back and forth, and transfer files, represents one specific application of the Rendezvous protocol. In general, the Rendezvous protocol typically operates within the standard TCP/IP protocol, but any suitable protocol other than TCP/IP may be used instead. In this regard, protocols facilitating a'reliable connection are preferable.

The Rendezvous protocol adds a rich body of flexibility to the event of chatting or otherwise interacting with another user. It recognizes that a user may wish to engage in a particular activity under specific circumstances for example, playing a computer game with certain other players, or discussing a particular subject in a private chat room. Rendezvous uses "flea market-style" negotiation as a model for negotiating parameters of the interaction environment. Among others, the types of parameters that users may wish to control include the number of other participants and the identities of those participants. For example, perhaps a user enjoys playing bridge while online, but only with three specific individuals; or perhaps a user desires to communicate with other computer game enthusiasts about a new online game. The Rendezvous protocol allows a user to propose a communication session subject to such parameters. Further, Rendezvous allows recipients of such proposals not only to accept or reject the proposal, but also to respond with a counterproposal that modifies one or more of the proposed parameters.

The Rendezvous protocol serves as the underlying structure of the AIM system. A basic message between buddies in the AIM system is referred to as an Inter-Client Basic Message, abbreviated ICBM. ICBMs are said to contain "payloads," which hold the informational content of an ICBM. An Instant Message (IM), which effectively is like an e-mail message that will be instantly displayed to the recipient, is an example of an ICBM payload. In general, a Rendezvous-based message is another example of an ICBM payload. (It is noted that there is one type of Rendezvous message, a Client Error message, to be described below, which is not an ICBM.)

As discussed above, one characteristic of the AIM system is the ability to "evil" another user. A user might employ the evil capability against another user in an instance in which the user was annoyed by an action taken by that other user that affected the first user. For example, suppose that a first user sends a series of IMs to a buddy (a second user), but after the third message, the buddy sends a message back requesting that the first user stop bothering the second user with all these boring messages. Despite this, the first user continues to send messages. The second user becomes annoyed and decides to evil, or warn, the sender. Evil can be employed generally on any ICBM. (It is noted that because a Client Error message is not an ICBM, it cannot be eviled for reasons discussed below.)

Figure 3:
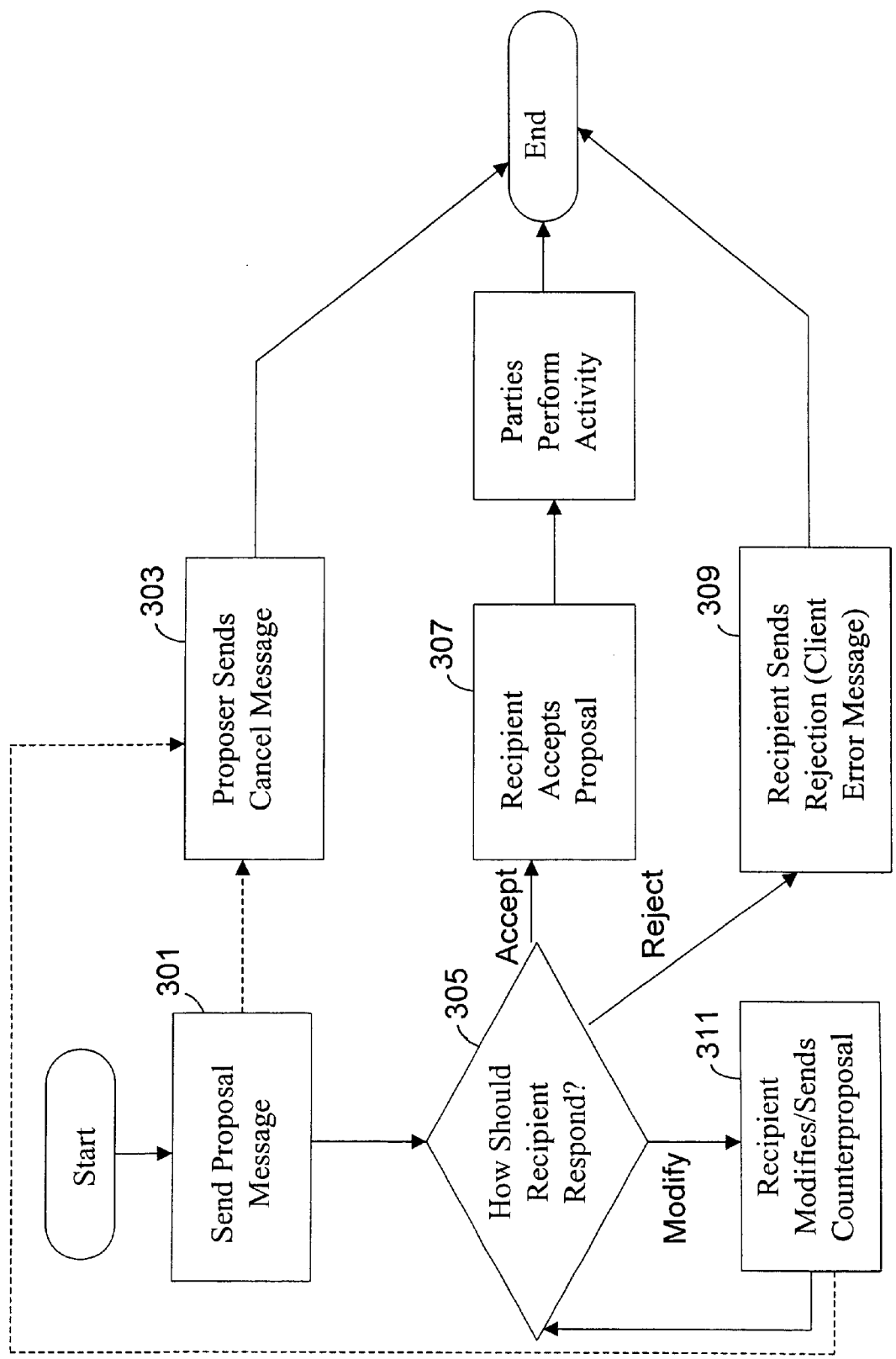
FIG. 3 is a flowchart illustrating a protocol for a negotiation process.

A process for negotiating parameters using the Rendezvous protocol process is illustrated by the flowchart in FIG. 3. A user (referred to as "the originator") who wishes to interact with one or more other users, for example, to set up a particular chat room environment, begins the Rendezvous session by sending a "Proposal" message to a buddy (step 301). The Proposal message contains the originator's proposal for the desired interaction—in this example, a specified chat room environment (e.g., topic, participants, etc.).

If at any time after sending a Proposal message (but prior to the negotiation process ending as a result of some other event, such as acceptance or timeout by the recipient), the originator wishes to cancel the proposal, this may be accomplished by sending out a Cancel message (step 303). A Cancel message allows the originator to provide a reason for the cancellation. The three valid types of Cancel reasons include "unknown", "user request", and "timeout". A normal cancellation, i.e., the originator changed his mind and does not desire to engage in an interaction, is denoted by specifying the Cancel reason as "user request". "Timeout" is given as the Cancel reason when the recipient fails to respond to the proposal in a timely manner and the originator gives up on waiting for a response and thus takes the proposal off the table. If the reason for the Cancel message is not known, the Cancel reason field will indicate "unknown".

Assuming that the original proposal has not been cancelled, the recipient of the proposal may respond to the proposal in several different ways (step 305). One way in which the recipient may respond is to accept the proposal exactly as proposed by sending an Accept message (step 307). This will cause the Rendezvous session to end successfully and allow the proposal originator and the proposal recipient to engage in the desired interaction (e.g., chat room) activity. It is noted that for the above implementation, the only way that a Rendezvous session can end successfully (i.e., the parties engage in an online activity which was agreed to via the Rendezvous session) is by way of an Accept message. However, depending on the objectives of the application developer, the Rendezvous protocol could be implemented such that other conditions (e.g., failure of recipient to object to a proposal under certain circumstances) could result in a successful termination.

Another way for the recipient to respond is to reject the proposal by sending a Client Error message (step 309). A Client Error message has a field that informs the originator of the reason for the rejection. Possible reasons include the following:

1) Proposal unsupported (e.g., recipient's computer is not configured to support)
2) Proposal denied
3) Proposal ignored
4) Proposal timed out
5) Busted parameters
6) Online but not available/busy "Proposal unsupported" is an appropriate reason when the recipient's computer is not configured properly in order to engage in the proposed interaction. "Proposal denied" is an explicit rejection of the proposal, indicating that the proposal recipient prefers not to engage in the interaction. "Proposal ignored" indicates that the recipient has actively chosen to ignore the proposal. "Proposal timed out" indicates that the recipient has failed to respond within a certain amount of time. "Busted parameters" denotes that the proposal message itself cannot be understood, e.g., if the proposal message became garbled in transmission and hence cannot be read by the recipient's computer. "Online but not available/busy" is the appropriate response when the recipient might otherwise be interested, but is too busy with other activities at that moment. For example, if the recipient is online because he is doing research for a project for work or school, and one of his buddies proposes that they play an online computer game, the recipient would most likely respond with a Client Error message specifying the reason "Online but not available/busy". The recipient can accomplish this by setting a software switch that automatically responds with the "busy" message, for each proposal received.

It is noted that, in this implementation, a Client Error message is the only type of Rendezvous message that cannot be eviled. All other Rendezvous message types are subject to eviling. The reason for this design decision is that allowing "evil" simply because a user has refused to engage in some interaction does not serve the purpose of "evil", which is to warn a user for abusing the computer resources. However, the Rendezvous protocol could be implemented such that any one or more of the available messages could be subject to evil, or not, depending on the implementor's objectives.

Another possible response by the recipient is to modify the proposal by sending a Propose message back to the originator (step 311). This message contains a counterproposal by the recipient. This is the basic means by which the two parties haggle over the details of the resultant chat room or other interaction (e.g., one-on-one games) environment. For example, suppose user A desires to play an, online computer game of bridge at the expert level with user B. User A proposes this to user B. However, user B prefers the intermediate level to the expert level, so user B sends a counterproposal to user A, proposing that the game be played at intermediate level instead. As a second example, suppose that user X and user Y are involved in a research project together, and they desire to enter a chat room in which their topic is often discussed. User X proposes to user Y that they meet together in a particular chat room that they have previously entered. However, user Y has heard about a different chat room that may offer better information, so user Y sends a counterproposal back to user X that they instead meet in the new chat room.

Once a counterproposal has been sent, the recipient of the counterproposal has the same options (i.e., Accept, refuse via Client Error message, or send another counterproposal via a Propose message) as the recipient of the original proposal had upon receiving the original proposal. That is, the counterproposal effectively is treated as a new proposal. The sender of the counterproposal has the option of cancelling the counterproposal via a Cancel message, just as the original proposer had the option of cancelling the original proposal. In this way, the Rendezvous session can continue back and forth until the users either agree on some online activity, or one of them decides to end the session via a Client Error message.

A representation of the Rendezvous protocol is provided in the Rendezvous State Transition Table, shown in FIG. 4. The State Transition Table lists the three possible states of a Rendezvous session: State 1 is that of the proposal originator; state 2 is that of the proposal recipient, and state 3 is the end state, in which the Rendezvous session is terminated. Once a proposal is sent, thereby initiating a Rendezvous session, the proposal originator enters state 1 and the proposal recipient enters state 2.

In state 1, one of five possible events will occur; these are represented by the five substates within state 1. If an Accept message is received (i.e., substate 1.1), the Rendezvous negotiation is successful, and the users go to substate 3.1, where the Rendezvous session ends and the agreed-upon online activity begins. If a Client Error message is received (i.e., substate 1.2), the Rendezvous negotiation is unsuccessful, and the users go to substate 3.2, where the Rendezvous session ends and the users discontinue their interaction. If a counterproposal is received (i.e., substate 1.3), that user becomes the proposal recipient with respect to that counterproposal and thus enters state 2. If either a Time Out (substate 1.4) occurs, or a Cancel message is sent (substate 1.5), the negotiation session is cancelled by going to substate 3.3, where the Rendezvous session ends and the users discontinue their interaction.

In state 2, four possible events can occur; these generally correspond with the five possible events listed in state 1 (the fourth event in state 2 (i.e., substate 2.4) corresponds to either of the fourth (substate 1.4) or fifth (substate 1.5) events in state 1). As the proposal recipient, the user in State 2 can send either an Accept message (substate 2.1), a Client Error message (substate 2.2), or a counterproposal (substate 2.3). The fourth possibility is the receipt of a Cancel message (substate 2.4). If an Accept message is sent, the Rendezvous negotiation is successful, and the users go to substate 3.1, where the Rendezvous session ends and the agreed-upon online activity begins. If a Client Error message is sent, the Rendezvous negotiation is unsuccessful, and the users go to substate 3.2, where the Rendezvous session ends and the users discontinue their interaction. If a counterproposal is sent, that user becomes the proposal originator and thus enters state 1. If a Cancel message is received, the negotiation session is cancelled by going to substate 3.3, where the Rendezvous session ends and the users discontinue their interaction.

In state 3, the Rendezvous session ends in one of three ways. A successful negotiation, substate 3.1, occurs when an Accept message is sent in response to a Proposal message. In this case, the two users will engage in the agreed-upon online interaction. An unsuccessful negotiation, substate 3.2, occurs when a Client Error message is sent in response to a Proposal message. In this case, the users that were involved in the Rendezvous session will discontinue their interaction. A cancelled negotiation, substate 3.3, occurs when a Cancel message is sent after a Proposal message was sent but prior to the receipt of a response. In this case, the users that were involved in the Rendezvous session will discontinue their interaction. In all three cases within state 3, the Rendezvous session is ended, as signified by the discontinued use of the Rendezvous "cookie", which is the unique identifier of that specific Rendezvous session.

Figure 5:
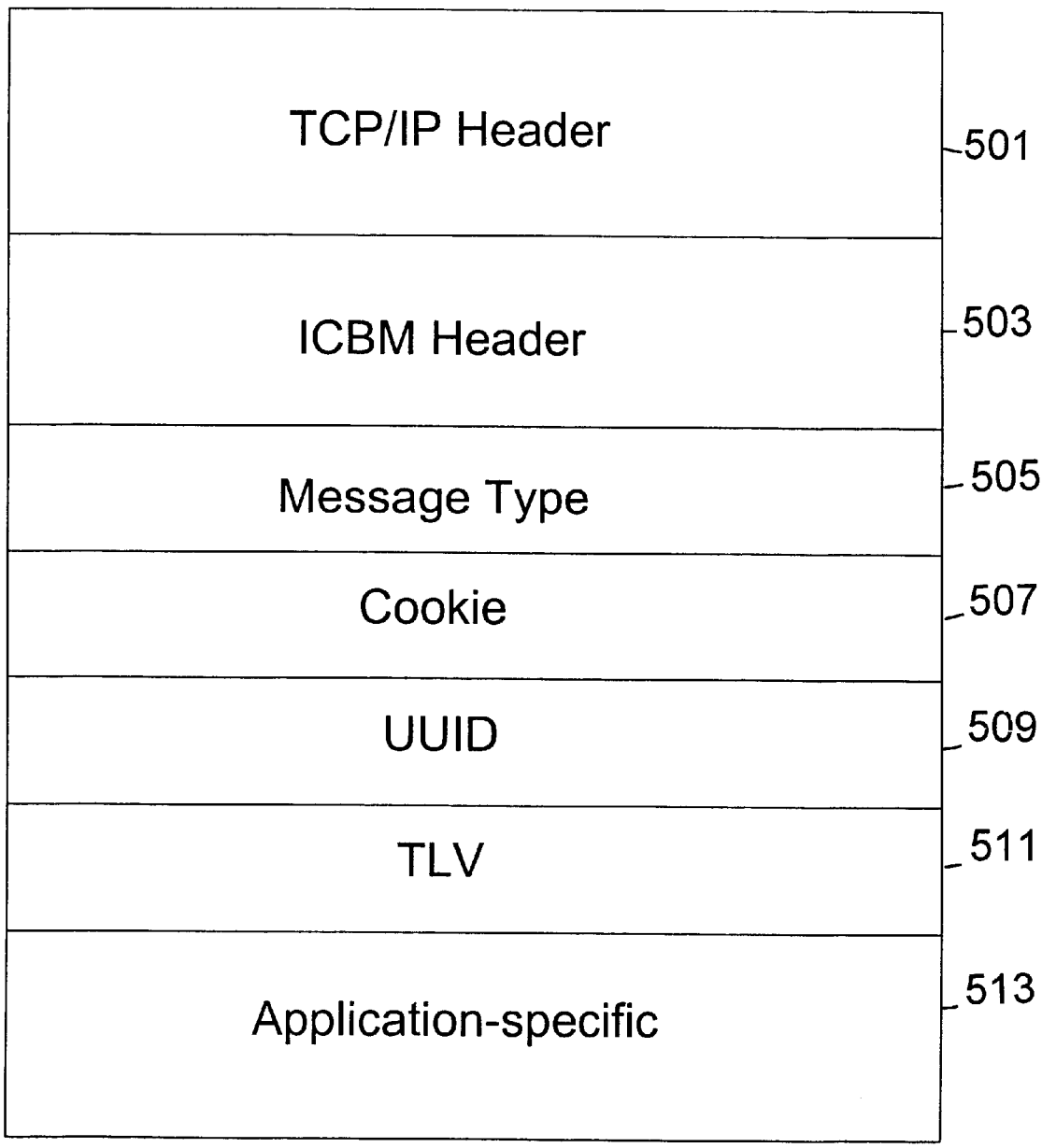
FIG. 5 is a diagram illustrating the data format of a negotiation protocol message.

A diagram showing the components and format of a Rendezvous message (except for a Client Error message) is shown in FIG. 5. (Because a Client Error message is not an ICBM, it has its own format, described below.) Because a Rendezvous message is an ICBM payload, and because all ICBMs use the standard TCP/IP protocol, the first two fields 501 and 503 in a Rendezvous message (other than a Client Error Message) are the TCP/IP header and the ICBM header. The ICBM header identifies the message as being a Rendezvous message. The next field 505 defines the Rendezvous Message Type and has a length of two bytes. Valid Message Types include Proposal, Cancel, and Accept. Valid data values for the fields shown in FIG. 5 are given in FIG. 6. As shown therein, the Message Type field can contain a "0" for a Proposal message, a "1" for a Cancel message, or a "2" for an Accept message.

Referring again to FIG. 5, the next field 507 in the Rendezvous Message is eight bytes long and is called the Cookie. The Cookie serves as a unique identifier for a specific Rendezvous negotiation session; thus, all ICBMs that are part of the same Rendezvous session have the same Cookie, but a new Rendezvous session will have a new Cookie.

The next field 509 is a 64-byte field called a UUID (Universal Unique Identifier). This field specifies the type of service desired. Referring again to FIG. 6, there are seven standard types of service that can be accessed with the Rendezvous protocol: "AOL Talk"; "Direct Play"; "File Transfer"; "Route Finder"; "Direct ICBM"; "Avatar Exchange"; and "Chat". Several of these services are available in AOL Instant Messenger Version 2.0. (It is noted that only the first twelve characters of the UUIDs are shown in FIG. 6. For all seven UUIDs given, the last twenty characters are 11D1-8222-444553540000.) "AOL Talk" refers to an AOL-compatible voice system that allows users to exchange audio messages with each other. "Direct Play" refers to playing an online computer game. "File Transfer" allows a computer file, such as a document, a spreadsheet, or a pictorial or graphical data file, to be transferred from one user to another. "Route Finder" allows users to find an Internet route for another application in a situation where a "firewall" is blocking the direct route to the desired application (e.g., if a user is online at the workplace, it is common for employers to set up firewalls—software agents that block designated network traffic). "Direct ICBM" (i.e., sending ICBMs through a direct TCP/IP connection between the originator's and recipient's client computers) allows users to exchange IMs directly with each other without having to go through the primary server for the AIM system, thus affording more speed and more privacy. It is noted that the Direct ICBM capability causes the users to lose the ability to use the "Evil" capability, and it also removes the protection against computer hackers that is normally provided by the primary AIM server. The Direct ICBM capability also may experience problems in penetrating firewalls. "Avatar Exchange" allows a user to exchange an image that typically represents the user's on-screen personality. "Avatar" is the term for this image, and it can be any graphical depiction, such as a cartoon, a drawing, or a photograph. "Chat" refers to a typical online dialogue in a chat room; this is typically performed by typing messages and sending them back and forth.

The Rendezvous protocol is not limited to the seven standard service types described above. Possible implementations include allowing user, for example, by accessing a special purpose users interface, to create their own UUIDs and corresponding applications.

Referring again to FIG. 5, the next field 511 is a set of ordered triples, each ordered triple consisting of a Type, a Length, and a Value; hence, this field is referred to as the "TLV" field. The TLV field includes up to 15 reserved parameters, plus the application-specific parameters. Referring to FIG. 7, which shows the 15 potential reserved parameters in the Type field and their corresponding numbers, the TLV field contains the information that is specifically being negotiated in the Rendezvous process. The first parameter in the TLV field is the "ICBM Channel" or equivalently, the "Rendezvous Channel". This parameter identifies the kind of ICBM being proposed, such as an online game or a chat.

The next three parameters in the TLV field are called "Rendezvous IP Address", "Proposer IP Address", and "Verified IP Address". An IP address, or Internet Protocol address, is a unique identifier for any computer or virtual location on the Internet. The Rendezvous IP address is the IP address at which the proposed interaction would occur. The Proposer IP Address is the actual IP address of the originator's computer. The Verified IP Address is the IP address of the originator's computer as seen by the primary AIM server. The verified IP address is different from the actual IP address when, as is sometimes the case, the computer associated with the actual IP address is behind an Address Translating Firewall to provide some protection against unauthorized use (i.e., computer hacking). In that situation, the use of a verified IP address allows users behind the firewall to communicate with others by having any responses directed to the verified IP address, rather than to the Proposer (i.e., actual) IP Address. The verified IP address also prevents "spoofing", which is the practice of providing another user with a false IP address.

The next parameter in the TLV field is called "Port", which is the value of the Transfer Control Protocol (TCP) port for the Rendezvous Channel. More generally, a "port" is a logical channel identifier used by TCP.

The next two parameters in the TLV field are called "Download URL" and "Verify Download URL" (URL= Universal Resource Locator; its specification can be found at RFC 1738). Download URL is an instruction to download the software or other data for whatever service is being proposed. Most Internet resources have a URL; URLs are commonly referred to as Web site addresses, although URLs can point to resources other than Web sites. As an example, if the users desire to play a computer game, such as bridge, the bridge software must be downloaded to their personal computer workstations in order to participate in the game. Verify Download URL has the same basic information content as the previous parameter, but it may be added by the primary AIM server for protective reasons.

The next parameter in the TLV field is called "Sequence Number", which is a one-up counter that iterates for each proposal within a specific Rendezvous negotiation session (i.e., all proposals and counterproposals having the same Rendezvous Cookie). The original proposal is given a sequence number equal to 1, the first counterproposal would be given a sequence number equal to 2, and so forth.

The next parameter in the TLV field is called "Cancel Reason", which indicates the reason that a given Rendezvous negotiation session is being cancelled. Valid reasons (described above) include "unknown", "user request", and "timeout".

The next parameter in the TLV field is called "Invitation". This is an arbitrary text string and is generally used to communicate in human-readable language. For example, suppose user P desires to play a game of online chess with user Q. User P will send a Proposal message to user Q, and the Invitation might say, "Hey Q, how about a game of chess?"

The last two reserved parameters in the TLV field are called "Invite Mime Character Set" and "Invite Mime Language". These parameters specify the character set and the language, respectively, that are used in the Invitation. Supported character sets include "US-ASCII", "ISO-8859-1" and "UNICODE-2-0". For the Mime protocol, valid values are specified by ISO 639, ISO 3166, and RFC 1766. If desired, the country also may be included (e.g., English-UK).

Lastly, referring once again to FIG. 5, the Rendezvous message contains a field 513 of application-specific parameters. The application-specific parameters also are part of the TLV field, but their Type field falls outside of the reserved range (i.e., the first 15 parameters). These parameters depend upon the application or service to be accessed. For example, different computer games that can be played online typically will have differing sets of parameters in this field.

Figure 8:
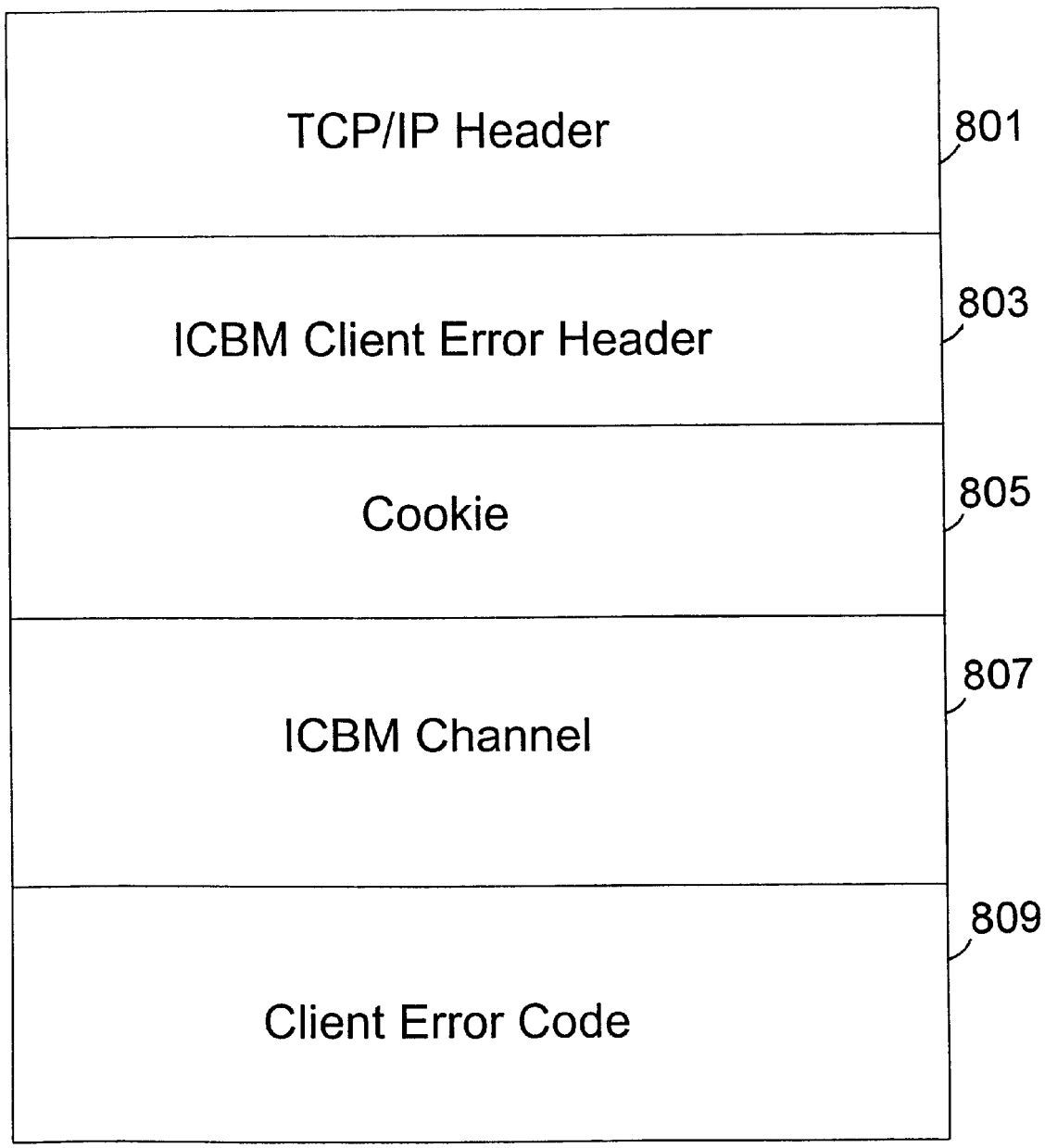
FIG. 8 is a diagram of a data format of a Client Error message.

As noted above, a Client Error Message is specifically excepted from the standard Rendezvous message format because it is designed to be not subject to "Evil". Although it is not an ICBM, it is a related message type referred to as an "ICBM Client Error" message. As such, it has its own data format, which is illustrated in FIG. 8. The first two fields 801 and 803 in any ICBM Client Error message are the TCP/IP header and the ICBM Client Error header. The next field 805 is the Cookie, which is the same value as in the Rendezvous messages within the same Rendezvous session (i.e., the Client Error Cookie necessarily has the identical value as the Cookie in the Proposal message to which the Client Error message is responding). The next field 807 is called ICBM Channel, which is the value of the channel on which the Rendezvous negotiation itself is occurring (usually equal to 2). (It is noted that in the Client Error context, the ICBM Channel field is different from the parameter of the same name in the TLV field of the Rendezvous message, where the ICBM Channel parameter refers to the channel where the proposed interaction would occur, not the channel where the Rendezvous negotiation itself is occurring.)

The last field 809 is the Client Error Code. Referring to FIG. 9, the possible values for the Client Error Code are given. These values correspond with the six possible reasons for a Client Error message, described above.

Figure 10:
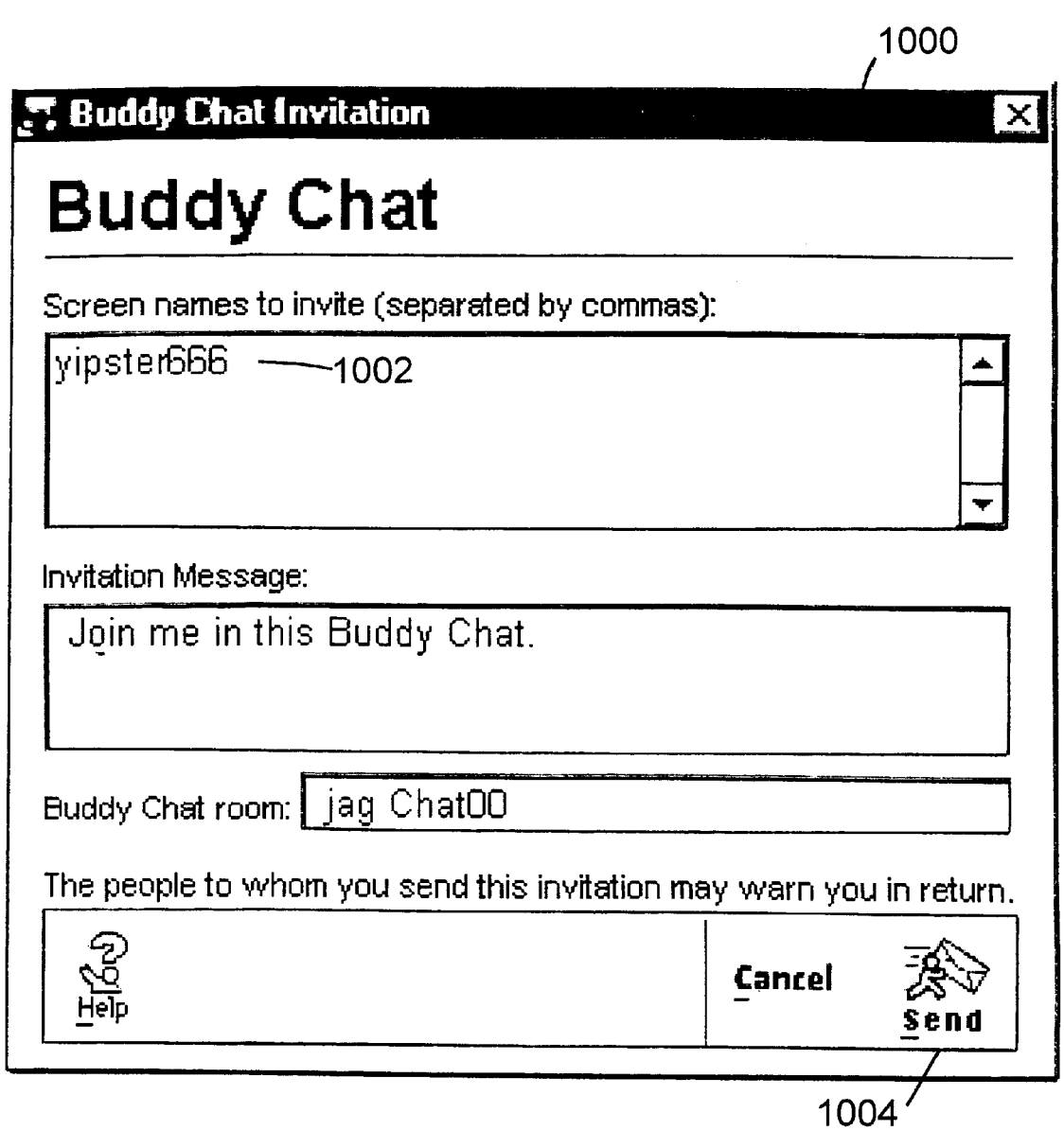
FIG. 10 is a screen shot showing an example of how a Chat proposal message appears to the online computer user who originates the proposal.

FIGS. 10, 11, 12, 13, and 14 show examples of screen shots as seen by users of AIM during Rendezvous-related negotiations. As noted above, AIM is one specific implementation of the Rendezvous protocol. FIG. 10 shows how a proposal message 1000 appears to the originator. In FIG. 10, the proposed activity is a chat, and the screen name 1002 of the intended recipient is "yipster666". The proposal message 1000 is transmitted to the recipient when the originator clicks on the "Send" button 1004 in the lower right-hand corner of the message box.

Figure 11:
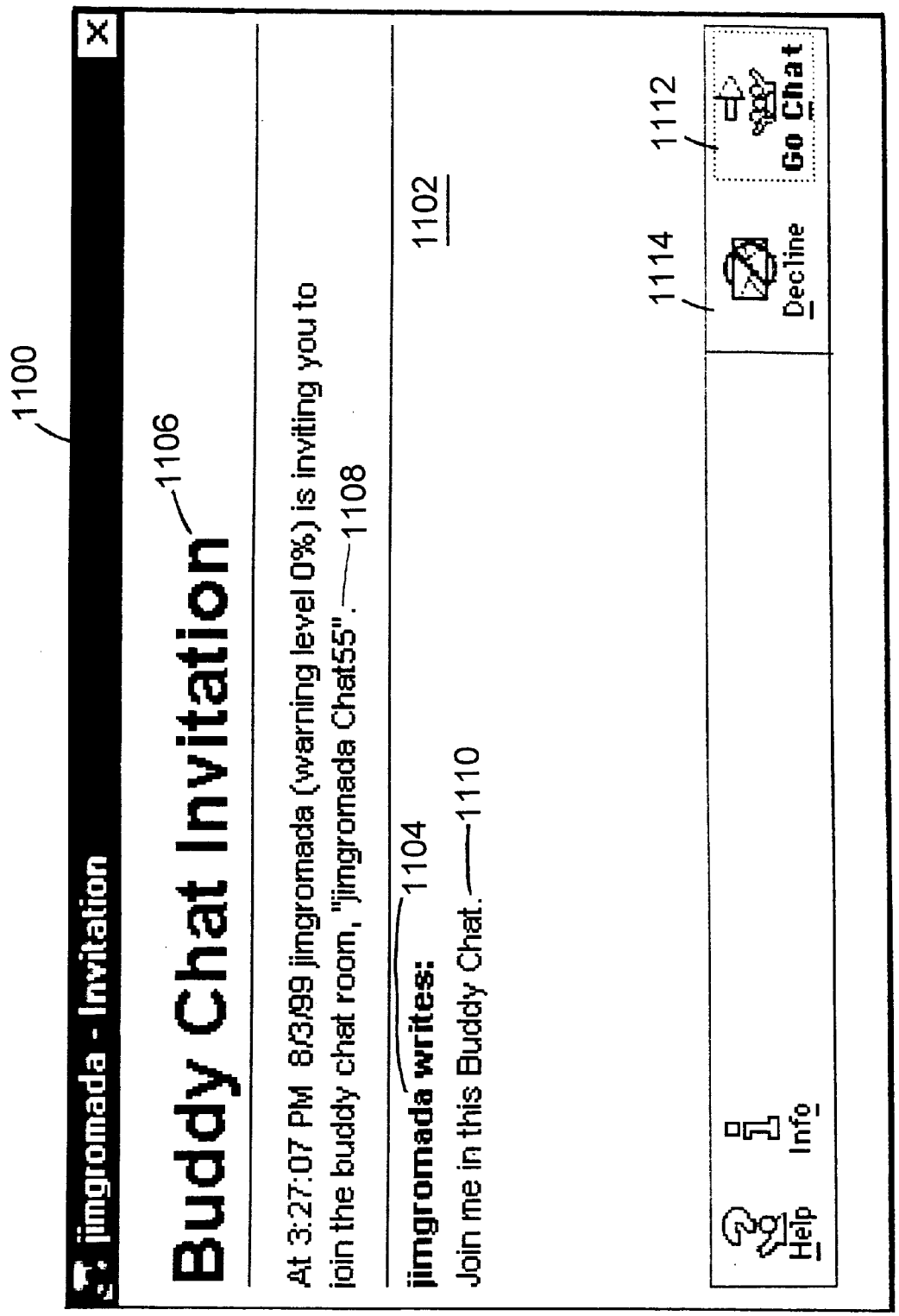
FIG. 11 is a screen shot showing an example of how a Chat proposal message appears to the online computer user who receives the proposal.

FIG. 11 shows the proposal message 1100 as it appears to the recipient. The message box 1102 shows the screen name 1104 of the proposal originator (in this case, "jimgromada"), the intended activity 1106 (a "Buddy Chat") the channel or location 1108 of the proposed activity (a chat room named "jag Chat00"), and the textual invitation line 1110, "Join me in this Buddy Chat". The recipient has the option of accepting the proposal by clicking on the "Go Chat" button 1112 in the lower right-hand corner, rejecting the proposal by clicking on the "Decline" button 1114, or causing the proposal to time out by not responding. (The option of modifying the proposal by presenting a counterproposal is not illustrated by this screen shot.)

Figure 12:
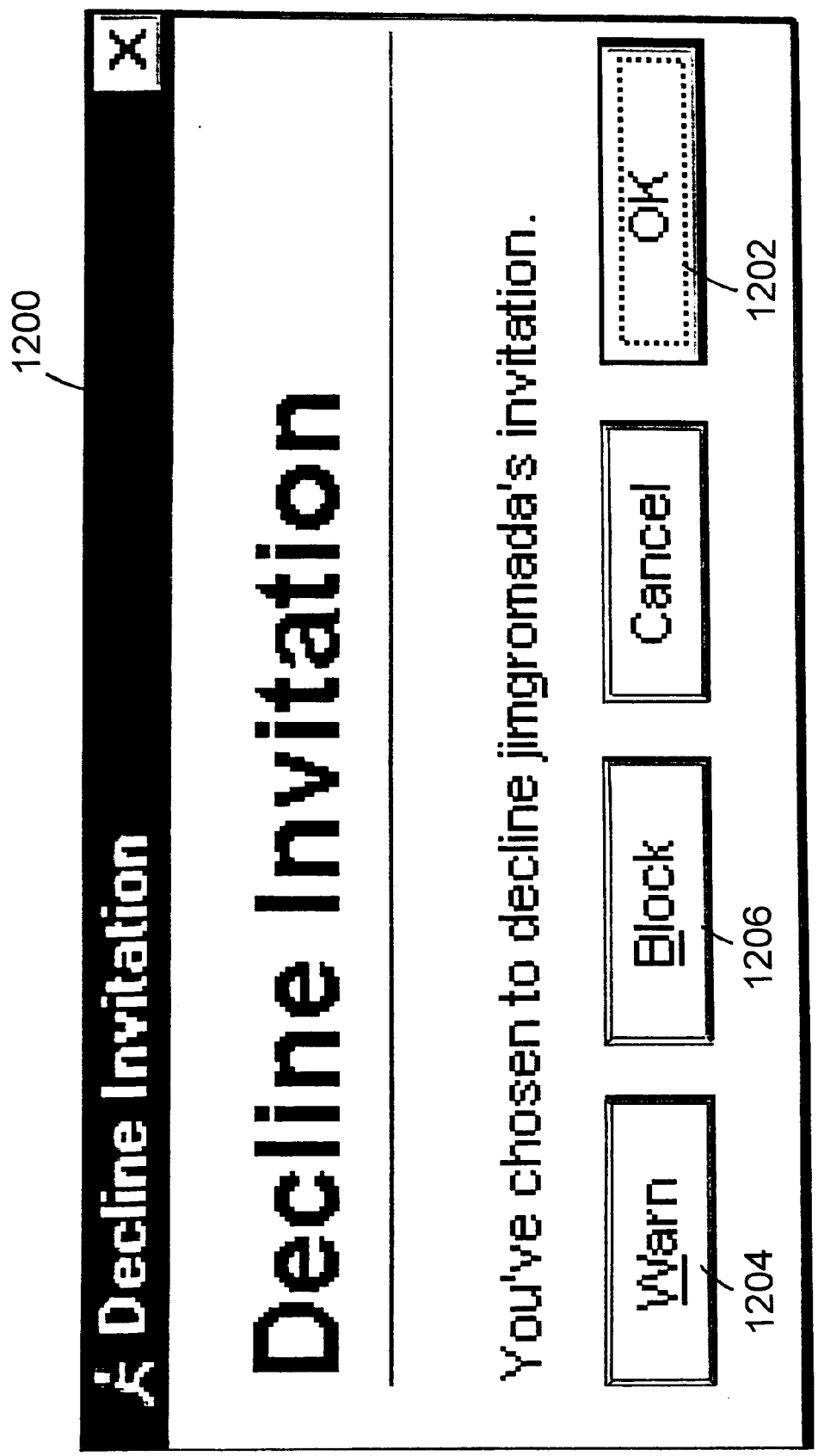
FIG. 12 is a screen shot showing an example of how a Client Error (rejection) message appears to the online computer user who rejects the proposal.

FIG. 12 shows a pop-up window 1200 that appears when the recipient decides to reject the proposal. This is the message box that appears on the recipient's screen as a result of clicking on the "Decline" button 1114. This "Decline Invitation" message 1200 will be transmitted to the proposal originator when the proposal recipient clicks on the "OK" button 1202. If the recipient wishes to "evil" the originator because the proposal is deemed offensive or annoying, the recipient may do this by clicking on the "Warn" button. The block button 1206 allows the receipt to block future proposals from this originator (jimgromada).

Figure 13:
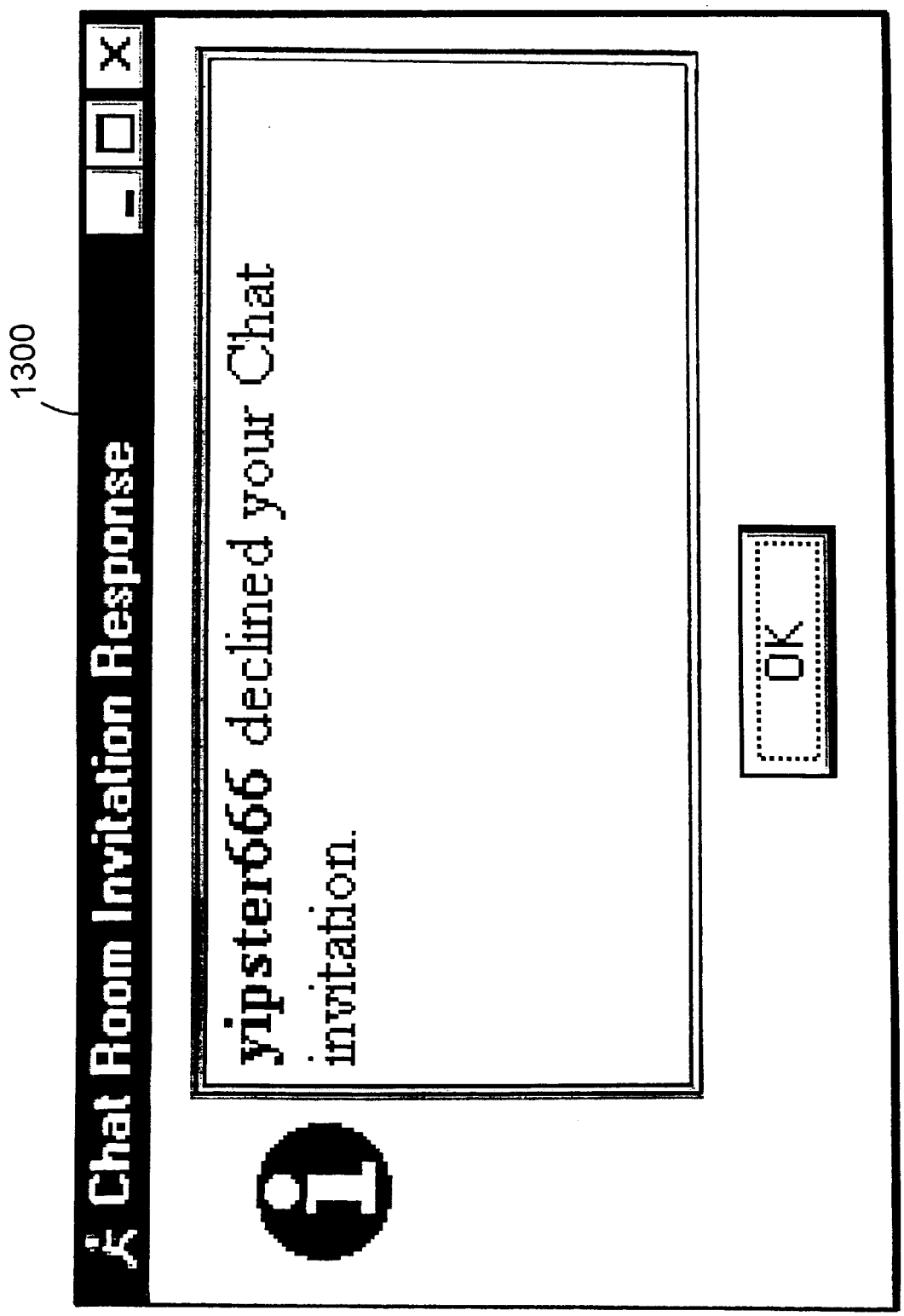
FIG. 13 is a screen shot showing an example of how a Client Error (rejection) message appears to the online computer user who originated the proposal being rejected.

In FIG. 13, the proposal originator has received the rejection message 1300 from the proposal recipient. Because this rejection message 1300 is by definition a Client Error message type, the proposal originator does not have the opportunity to "evil" the recipient, even though the proposal was rejected. The only option available to the proposal originator is to click the "OK" button.

Figure 14:
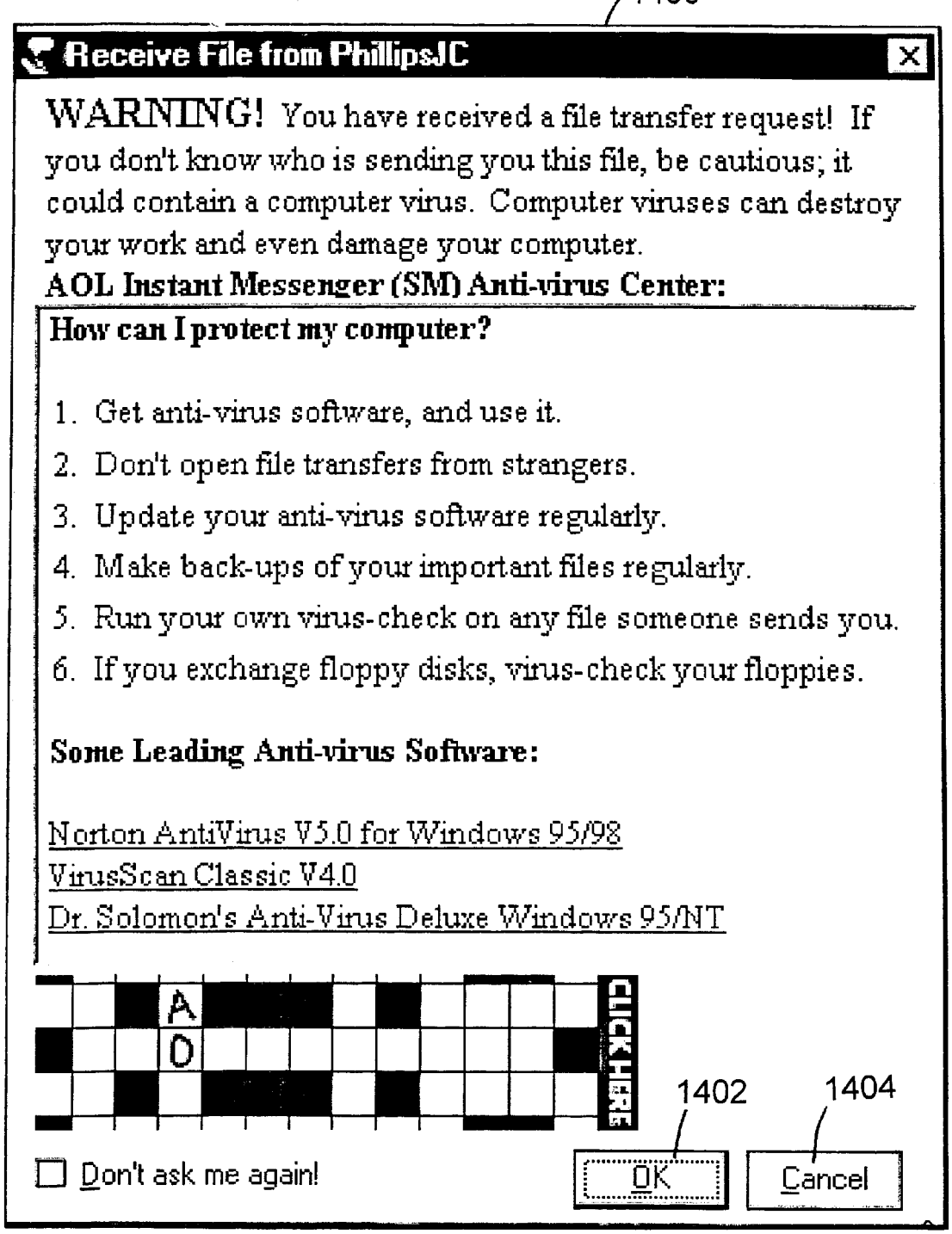
FIG. 14 is a screen shot showing an example of how a File Transfer proposal message appears to the online computer user who receives the proposal.

FIG. 14 shows a screen shot of a window 1400 that appears when a user receives a file transfer request from another user. File Transfer is one of the activities supported by the Rendezvous protocol. The recipient may either accept the file transfer request by clicking on "OK" 1402, or reject the request by clicking on "Cancel" 1404, corresponding to an acceptance and rejection, respectively, of the proposal (i.e., file transfer).

Figure 15:
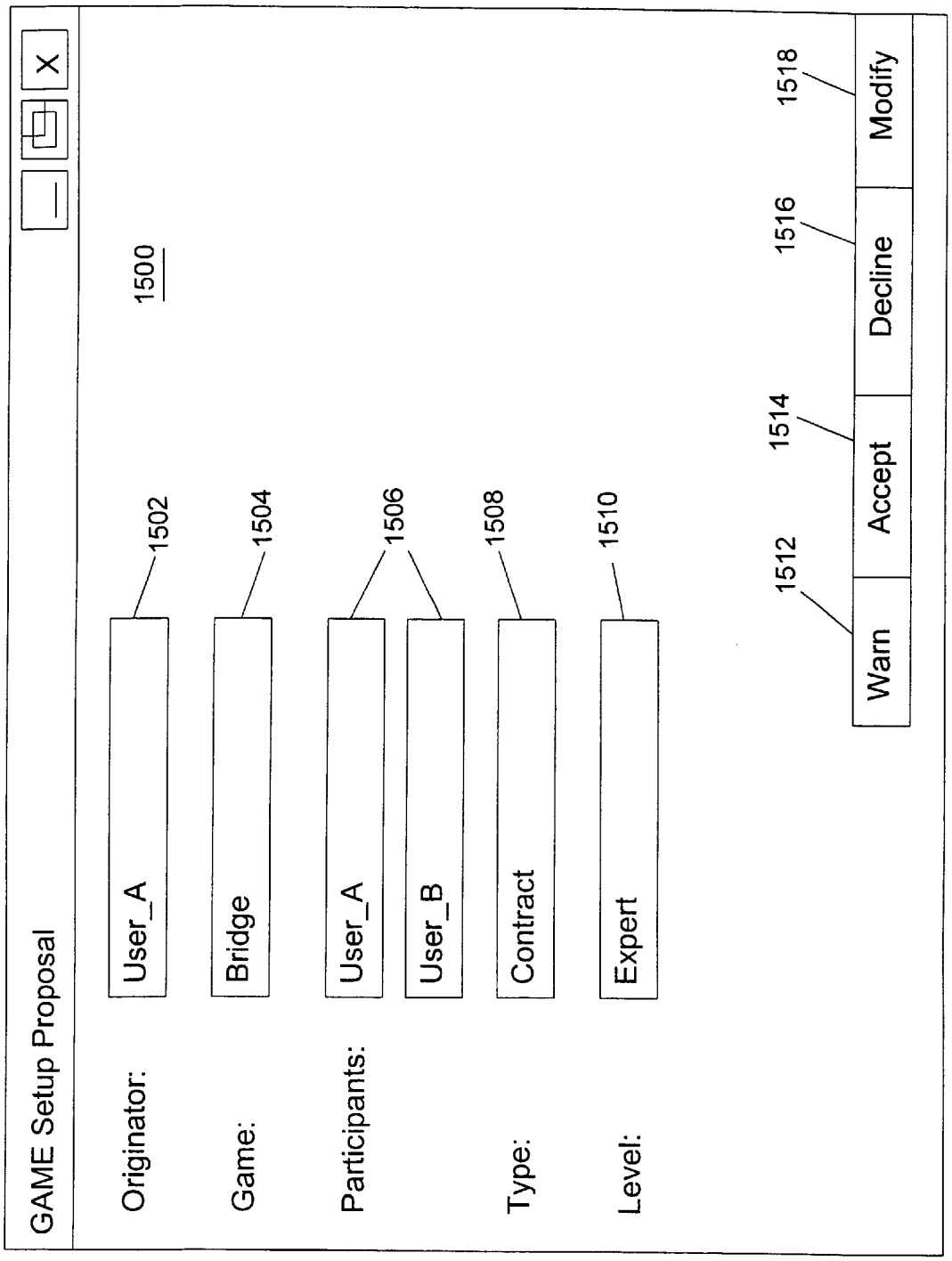
FIG. 15 illustrates an example of how a Direct Play (computer game) proposal message would appear to the online computer user who originates the proposal.

In FIG. 15, a depiction of an online computer game proposal message 1500 is shown. The proposal originator 1502, User_A, desires to play a particular game 1504 (contract bridge) at an expert level 1510 with participants 1506 (User_A and User_B). FIG. 15 illustrates how the proposal message would look as received by User_B, who has the opportunity to respond by clicking on the appropriate button at the bottom of the message box. If User_B is offended by the proposal, this can be registered by clicking on the "Warn" button 1512. If User_B would like to accept the proposal as tendered, the "Accept" 1514 button should be clicked. If User_B does not wish to play online bridge at all, the "Decline" button 1516 should be clicked (or the proposal will eventually be declined by timeout if User_B does not click on any buttons). If User_B wishes to play but disagrees with one or more of the parameters shown (e.g., game 1504, participants 1506, type 1508, level 1510), the "Modify" button may be clicked to allow User_B to present a counterproposal.

Figure 16:
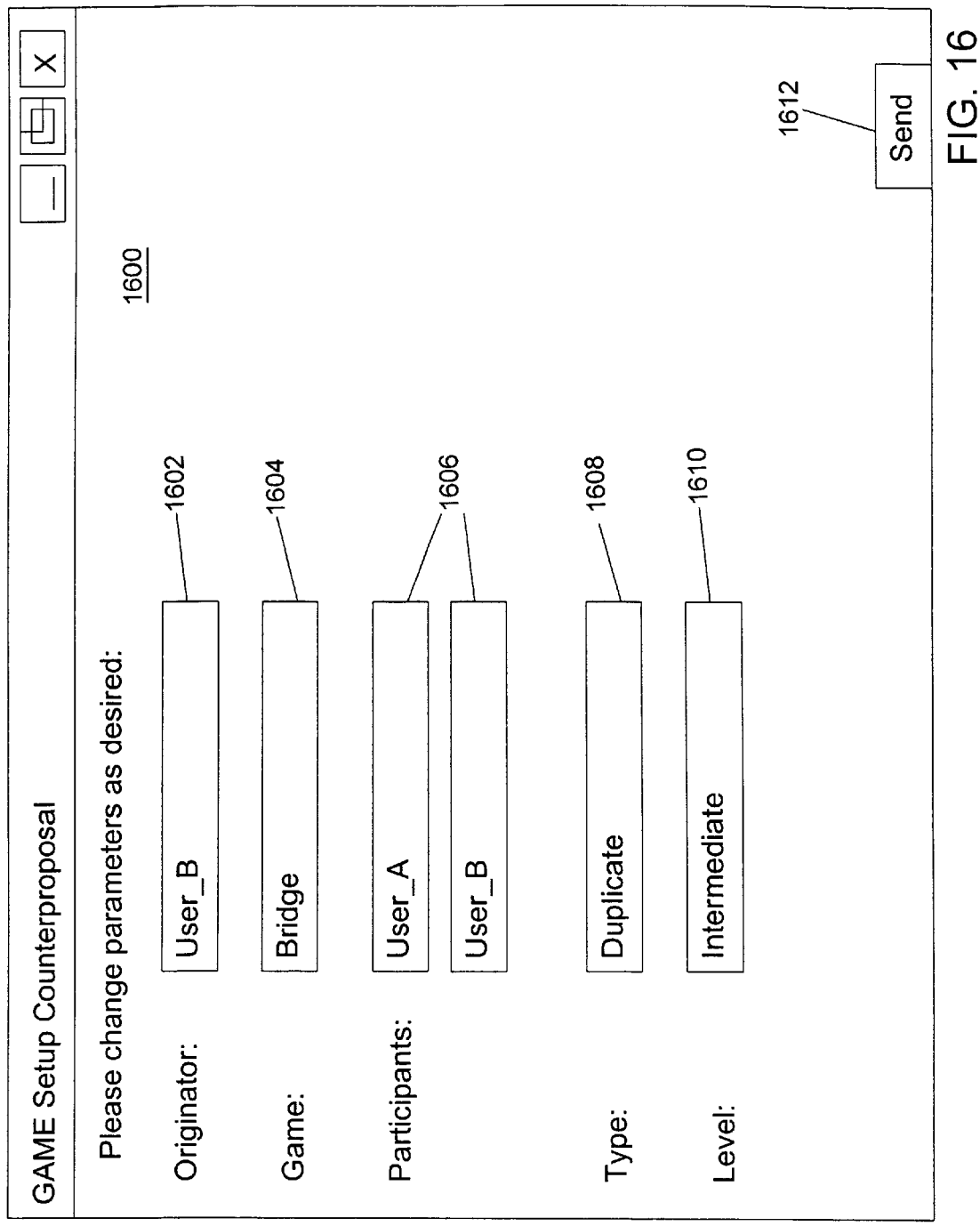
FIG. 16 illustrates an example of how a Direct Play counterproposal message would appear to the online computer user who received the original proposal and who responds with a counterproposal. Like reference numbers and designations in the various drawings indicate like elements.

FIG. 16 shows how such a counterproposal box 1600 might appear to the user desiring to modify the original proposal (i.e., User_B in the example depicted in both FIG. 15 and FIG. 16). The originator 1602 is now User_B, because a counterproposal acts as a new proposal, and User_B is originating the counterproposal. It is noted that, because this counterproposal is part of the same Rendezvous negotiation session, the Cookie for the original proposal will be the same as the Cookie for the counterproposal. However, the Sequence Number for the original proposal will be equal to 1, and the Sequence Number for the counterproposal will be equal to 2. Both the Cookie and the Sequence Number are software parameters that are transparent to the users involved in the Rendezvous negotiation session.

Referring again to FIG. 16, User_B agrees that playing online bridge with User_A is desirable. However, User_B prefers a different type 1608 of bridge (duplicate bridge) rather than contract bridge, and User_B also prefers to play at the intermediate level 1610 rather than the expert level. Thus, these parameters have been modified in the counterproposal message box 1600, which will be sent back to User_A. User_A will then have the same options for responding (i.e., Warn, Accept, Decline, or Modify), and the Rendezvous negotiation session will continue in that manner until it ends either with an acceptance (i.e., recipient of most recent proposal clicks "Accept"), a rejection (i.e., recipient of most recent proposal clicks "Decline"), or a cancellation (i.e., sender of most recent proposal cancels by clicking a "Cancel" button after sending proposal but before receiving response).

Other implementations of and uses for the Rendezvous protocol described above are possible. In general, the Rendezvous protocol can be used whenever it is desirable to allow two or more users, or two or more client computers, to negotiate the parameters of a communication or interaction session. For example, the Rendezvous protocol could be used in e-commerce applications to allow buyers and sellers to haggle over price or other terms relating to an offer for the sale of goods, services, securities or any other tangible or intangible property. In addition, the Rendezvous protocol could be used in a collaborative project development environment (e.g., Lotus Domino) to negotiate changes to documents and the like.

The techniques, methods and systems described here may find applicability in any computing or processing environment in which electronic content may be exchanged, viewed, accessed or otherwise manipulated. Various implementations of the systems and techniques described here may be realized in digital electronic circuitry, or in computer hardware, firmware, software, or in combinations thereof. A system or other apparatus that uses one or more of the techniques and methods described here may be implemented as a computer-readable storage medium, configured with a computer program, where the storage medium so configured causes a computer system to operate on input and/or generate output in a specific and predefined manner. Such a computer system may include one or more programmable processors that receive data and instructions from, and transmit data and instructions to, a data storage system, and suitable input and output devices.

Each computer program may be implemented in a high-level procedural or object-oriented programming language, or in assembly or machine language if desired; and in any case, the language may be a compiled or interpreted language. Suitable processors include, by way of example, both general and special purpose microprocessors.

Generally, a processor will receive instructions and data from a read-only memory and/or a random access memory. Storage devices suitable for tangibly embodying computer program instructions and data include all forms of non-volatile memory, including semiconductor memory devices, such as EPROM, EEPROM, and flash memory devices; magnetic disks such as internal hard disks and removable disks; magneto-optical disks; and CD-ROM disks.

Any of the foregoing may be supplemented by, or implemented in, specially-designed ASICs (application-specific integrated circuits).

A number of embodiments of the present invention have been described. Nevertheless, it will be understood that various modifications may be made without departing from the spirit and scope of the invention. Accordingly, other embodiments are within the scope of the following claims.

What is claimed is:

1. A computer-implement method of facilitating interactions between users of a computer network, the method comprising:

transmitting a first user's proposal for an activity to another user; the proposal comprising one or more parameters descriptive of the proposed activity;

receiving a response from the other user, the response comprising a counterproposal having one or more parameters descriptive of the proposed activity, with at least one of the parameters of the counterproposal differing from a corresponding parameter of the proposal; and automatically engaging in the proposed activity using the parameters included in the counterproposal upon acceptance of the counterproposal by the first user.

2. The method of claim 1 wherein the proposed activity comprises a chat session.

3. The method of claim 2 wherein the parameters describe a proposed topic on which the chat session will be focused.

4. The method of claim 2 wherein the parameters describe a proposed channel in which the chat session will take place.

5. The method of claim 1 wherein the proposed activity comprises an online game.

6. The method of claim 5 wherein the parameters specify proposed participants in the proposed online game.

7. The method of claim 1 further comprising transmitting a response to the counterproposal, the counterproposal response comprising an acceptance, a rejection, or a second counterproposal.

8. The method of claim 7 wherein a rejection indicates disagreement with at least one parameter of the proposal.

9. The method of claim 7 wherein an acceptance indicates agreement to all parameters of the proposal.

10. The method of claim 1 wherein the parameters are completely descriptive of the proposed activity.

11. The method of claim 7 further comprising iteratively responding to further counterproposals until acceptance or rejection occurs.

12. The method of claim 1 further comprising issuing a cancellation of a proposal or counterproposal.

13. The method of claim 12 wherein the cancellation must be issued before acceptance or rejection of the proposal or counterproposal occurs.

14. The method of claim 13 wherein the cancellation is transmitted by the user that transmitted the proposal or counterproposal to which the cancellation applies.

15. The method of claim 14 wherein the cancellation includes a reason for the cancellation.

16. The method of claim 1 wherein the response can further comprise an ignore indication.

17. The method of claim 16 wherein receipt of the ignore indication acts as a rejection of the proposal or counterproposal.

18. The method of claim 16 wherein the ignore indication is issued based on an explicit act by a user.

19. The method of claim 16 wherein the ignore indication is issued based on inaction by a user.

20. The method of claim 1 further comprising transmitting a message registering displeasure with the counterproposal.

21. The method of claim 20 wherein the message registering displeasure comprises an "Evil" message.

22. The method of claim 21 wherein an Evil message has a cumulative effect upon a recipient's ability to use the computer network.

23. The method of claim 22 wherein the cumulative effect grows exponentially.

24. The method of claim 1 wherein the first user's proposal is based on text or data entered by the first user.

25. The method of claim 24 wherein the first user's proposal is based on text entered by the first user.

26. The method of claim 1 wherein the response is transmitted automatically.

27. The method of claim 1 wherein the proposal includes an instant message.

28. The method of claim 1 wherein the response includes an instant message.

29. A computer-implemented method of producing an optimal environment for an online activity involving two or more computer network users, the method comprising:

allowing a first user to send a proposal for an online activity to one or more other users, the proposal specifying parameters associated with the proposed online activity; and enabling the first user and one or more other users to negotiate the parameters of the proposal using counterproposals that specify parameters associated with the proposed online activity, with at least one of the counterproposal parameters differing from the parameters of the proposal, until an agreement is reached.

30. The method of claim 29 wherein allowing a first user to send a proposal is implemented using a negotiation protocol.

31. The method of claim 29 wherein negotiating parameters of the proposal comprises selectively exchanging one or more counterproposal messages until an acceptance or a rejection occurs.

32. The method of claim 29, wherein the online activity comprises one or more of the following activities:

exchanging voice messages, playing an online game, finding a route from one client computer to another, transferring files, direct instant messaging, exchanging avatars, or participating in a chat room.

33. The method of claim 29, wherein the online activity comprises e-commerce.

34. The method of claim 29, wherein the online activity comprises a collaborative effort on a project.

35. A negotiation protocol for facilitating interactions between users on a computer network, the protocol comprising:

a proposal message type including parameters descriptive of a proposed activity;

an acceptance message type indicating agreement with all parameters of a proposal;

a rejection message type indicating disagreement with at least one of a proposal's parameters; and a cancel message type for withdrawing a proposal issued in a previous proposal message.

36. The negotiation protocol of claim 35 wherein the rejection message type indicates that the proposed activity was denied by a recipient of the proposal.

37. The negotiation protocol of claim 35 wherein the rejection message type indicates that a recipient of the proposal explicitly ignored the proposal.

38. The negotiation protocol of claim 35 wherein the rejection message type indicates that the proposal timed-out.

39. The negotiation protocol of claim 35 wherein the proposal message type can be used to issue a counterproposal message in response to a received proposal message, the counterproposal message including at least one parameter that differs from the proposal message's parameters.

40. The negotiation protocol of claim 35 wherein the proposal, acceptance, rejection and cancel message types can be used to negotiate the parameters of one or more of following activities: exchanging voice messages, playing an online game, finding a route from one client computer to another, transferring files, direct instant messaging, exchanging avatars, or participating in a chat room.

41. The negotiation protocol of claim 35 wherein the rejection message type indicates that the proposed activity is unsupported by a client computer associated with a recipient of the proposal.

42. The negotiation protocol of claim 35 wherein the rejection message type indicates that the proposal message could not be understood.

43. A computer-based system for facilitating interactions among users of a computer-network, the system comprising:

two or more client computers having software that allows different users to interact with each other; and a negotiation protocol, supported by each of the client computers, that allows users to negotiate parameters of an online activity using counterproposals that modify parameters of the online activity.

44. The system of claim 43 in which the software on the client computers enables users to interact in one or more of the following activities: exchanging voice messages, playing an online game, finding a route from one client computer to another, transferring files, direct instant messaging, exchanging avatars, or participating in a chat room.

45. The system of claim 43 in which the client computer software comprises an instant messaging client application.

46. The system of claim 43 in which the negotiation protocol comprises the following message types:

a proposal message type including parameters descriptive of a proposed activity;

an acceptance message type indicating agreement with all parameters of a proposal;

a rejection message type indicating disagreement with at least one of a proposal's parameters; and a cancel message type for withdrawing a proposal issued in a previous proposal message.

47. The system of claim 46 in which negotiation protocol messages are exchanged among users until mutually agreeable parameters of an online activity are established.

48. The system of claim 43 further comprising a software-implemented mechanism for registering displeasure with a user's behavior during a negotiation session.

49. The system of claim 48 wherein the mechanism for registering displeasure enables a user to affect another user's ability to access system resources.

50. A computer protocol process for conducting a negotiation between two or more online computer users, including a first user and a second user, with the objective of engaging in a mutually desirable online activity in an environment having specified characteristics, the process comprising:

(a) issuing a proposal message from the first user to the second user, the proposal message specifying the particular environmental characteristics desired by the first user;

(b) issuing a first response from the second user to the first user, the response comprising an accept message indicating agreement with the proposal, a reject message indicating disagreement with at least one aspect of the proposal, or a counterproposal offering to change one or more aspects of the proposal;

(c) if the second user issues a counterproposal, issuing a second response from the first user to the second user, the second response comprising an accept message indicating agreement with the counterproposal, a reject message indicating disagreement with at least one aspect of the counterproposal, or another counterproposal offering to change one or more aspects of the counterproposal; and (d) repeating steps (b) and (c) until acceptance, rejection or cancellation occur, cancellation representing a withdrawal of a proposal or counterproposal.

51. A computer-implemented method of facilitating e-commerce transactions between users of a computer network, the method comprising:

transmitting to another user a first user's proposal for an e-commerce transaction; the proposal comprising one or more parameters descriptive of the proposed transaction;

receiving a response from the other user, the response comprising a counterproposal having one or more parameters descriptive of the proposed transaction, with at least one of the parameters of the counterproposal differing from the corresponding parameters of the proposal; and automatically completing the proposed transaction using the parameters included in the counterproposal upon acceptance of the counterproposal by the first user.

52. The method of claim 51, wherein the e-commerce transaction comprises a sale/purchase of goods/services.

53. The method of claim 51, wherein the e-commerce transaction comprises a sale/purchase of intangible property.

54. The method of claim 51, wherein the parameters of the proposal comprise price, delivery details, model, style, color, and warranty details.

55. Computer software, tangibly embodied in a computer-readable medium or propagated carrier signal, for facilitating interaction among users of a computer network, the software comprising instructions for causing a computer system to perform the following operations:

allow a first user to send a proposal for an online activity to one or more other users, the proposal specifying parameters associated with the proposed online activity; and enable the first user and one or more other users to negotiate the parameters of the proposal using counterproposals that specify parameters associated with the proposed online activity, with at least one of the counterproposal parameters differing from the parameters of the proposal, until an agreement is reached.

* * * * *